(12) United States Patent
Wilcke

(10) Patent No.: US 6,240,209 B1
(45) Date of Patent: *May 29, 2001

(54) METHOD FOR DERIVING CHARACTER FEATURES IN A CHARACTER RECOGNITION SYSTEM

(75) Inventor: Robert Wilcke, Noordwijk (NL)

(73) Assignee: Koninklijke PTT Nederland N.V. (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/346,594

(22) Filed: Jul. 2, 1999

Related U.S. Application Data

(60) Continuation of application No. 08/552,606, filed on Nov. 3, 1995, which is a division of application No. 08/170,035, filed on Dec. 20, 1993, now abandoned.

(30) Foreign Application Priority Data

Dec. 30, 1992 (EP) .................................................. 92204106

(51) Int. Cl.[7] ........................................................ G06K 9/48
(52) U.S. Cl. .......................... 382/198; 382/200; 382/201
(58) Field of Search .................................... 382/197, 190, 382/192, 195, 198, 199, 200, 181, 201, 119, 186, 124–127

(56) References Cited

U.S. PATENT DOCUMENTS

| | | | |
|---|---|---|---|
| 3,999,161 | 12/1976 | van Bilzem et al. | 382/203 |
| 4,040,009 | 8/1977 | Kadota et al. | 382/197 |
| 4,566,124 | 1/1986 | Yamamoto et al. | 382/197 |
| 4,607,386 | 8/1986 | Morita et al. | 382/201 |
| 4,628,532 * | 12/1986 | Stone et al. | 382/197 |
| 4,718,103 | 1/1988 | Shojima et al. | 382/197 |
| 4,956,869 | 9/1990 | Miyatake et al. | 382/242 |
| 5,182,777 | 1/1993 | Nakayama et al. | 382/197 |
| 5,245,674 | 9/1993 | Cass et al. | 382/200 |
| 5,351,310 | 9/1994 | Califano et al. | 382/199 |
| 5,416,851 * | 5/1995 | Huttenlocher et al. | 382/196 |
| 5,513,277 * | 4/1996 | Huttenlocher | 382/171 |
| 5,694,486 | 12/1997 | Shigeedu et al. | 382/197 |

FOREIGN PATENT DOCUMENTS

| | | |
|---|---|---|
| 0 476 852 | 3/1992 | (EP) . |
| 59-27380 | 2/1984 | (JP) . |
| 4-106683 | 4/1992 | (JP) . |

OTHER PUBLICATIONS

P.E. Danielsson, "Euclidean Distance Mapping", *Computer Graphics and Image Processing*, 14 (1980), pp. 227–248.

(List continued on next page.)

*Primary Examiner*—Jon Chang
(74) *Attorney, Agent, or Firm*—Michaelson & Wallace; Peter L. Michaelson

(57) ABSTRACT

A method for deriving character features in a character recognition system for recognising characters, such as letters and digits, and a character recognition system in which the method is applied. After deriving a character description from a recorded image pattern of a character to be recognised, a unique point $P_i$ of said character description is appended, by means of a distance transform, to each point $R_i$ of a subset $R=\{R_i/i=1, - - - ,N\}$ of preselected reference points in the plane of said image pattern. Feature values of one or more features possessed by the character description in each appended unique point are then determined. If the character description is a contour description, the unique point $P_i$ appended to each reference point $R_i$ is that point where the reference point $R_i$ has the shortest distance $D(R_i)$ to the contour of the character, and the character features selected are the shortest distance $D(R_i)$ and the direction $H(R_i)$ of the contour in the appended point $P_i$.

9 Claims, 6 Drawing Sheets

OTHER PUBLICATIONS

R. Oka, "Handwritten Chinese–Japanese Characters Recognition by Using Cellular Feature", *Institute of Electrical and Electronics Engineers*, Proceedings of the International Joint Conference on Pattern Recognition, Munich, Oct. 19–22, 1982, Part 2, Proc. 6, cover page and pp. 783–785.

M. Sano et al., "Gray–Level Image Recognition Based on Multiple Cell–Features", *Systems and Computers in Japan*, vol. 22, No. 5 (1991), pp. 81–93.

J. Tsukumo et al, "Machine Printed Chinese and Japanese Character Recognition Method and Experiments for Reading Japanese Pocket Books", *IEEE Computer Society*, Conference on Computer Vision and Pattern Recognition, Jun. 22–26, 1986, Miami Beach, Florida, cover page and pp. 162–167.

* cited by examiner

METHOD FOR DERIVING CHARACTER FEATURES IN A CHARACTER RECOGNITION SYSTEM

This application is a continuation of patent application Ser. No. 08/552,606 filed Nov. 3, 1995 which is a divisional of Ser. No. 08/170,035 filed Dec. 20, 1993 abandoned and entitled "METHOD FOR DERIVING CHARACTER FEATURES IN A CHARACTER RECOGNITION SYSTEM".

A. BACKGROUND OF THE INVENTION

1. Field of the Invention

The invention is in the field of pattern recognition. It relates to a system for recognising characters, such as digits and letters, both in handwritten and printed form, and more particularly to a method for deriving features of a character to be recognised in a character recognition system of this type.

2. Prior Art

Character recognition systems such as those indicated above usually comprise a number of process steps which are described below with reference to a block diagram shown in FIG. 1a. Said process steps are:

(1) optical scanning of a character on the surface of a carrier; such scanning, for example with a video camera, results in a two-dimensional pixel pattern, for example 64×64 pixels, to which a grey value encoded in 5 bits is appended;

(2) binary quantization of the pixel pattern, by subjecting the grey values of all the pixels to a threshold operation, the result, which can be seen as a black/white pattern or a pattern of "zeros" and "ones", being stored in a memory;

(3) deriving, from said quantized pixel pattern, a description of the character to be recognized;

(4) deriving, from the description, a set of character features of the character to be recognized, such as distance tags or structural characteristics to be discussed in more detail shortly with respect to pertinent prior art references;

(5) checking the set of character features found against results obtained previously with the aid of learning processes on known characters;

(6) deciding, on the basis of the check, which known character the character to be recognized is recognized as.

A recognition technique of this type is known, for example, from U.S. Pat. No. 4,566,124 entitled "Pattern Reading System". In this technique the quantized pixel pattern is used to derive a contour description. The term 'contour' has a well-accepted meaning in the field of character recognition, with the discussion in U.S. Pat. No. 4,566,154 being representative of the connotation of the term 'contour' set forth in prior art references in this field. For instance, a 'contour', for the case of a black-and-white image pattern in an image plane, is a closed enveloping line encompassing closed areas of the same color (black or white). Accordingly, hereinafter, the term 'contour' conforms to the conventional usage of this term in the art, that is, what those of ordinary skill in the art would ascribe to its meaning and usage. As a contour of a digitized pattern of a feature to be recognized is followed, the coordinates of certain points are selected. Those points are selected whose inner product of the point vector corresponding to each point and a directional vector in a number of predefined directions has the highest value. A selected point is characterized as an "extreme point" if the difference between said inner product at that point and the inner product at the following selected point exceeds a previously established limit value. Said extreme points define a polygonal approximation of the contour of the pattern. Said polygon shows a pattern of convex and concave structures. Said pattern is used for comparison with similar patterns, which are characteristic of known characters and stored in a previously compiled "dictionary". The character to be recognized is read as that known character whose patterns show the best correspondence.

A limitation of the pattern features derived in said known recognition technique is its being based on a structural description of the patterns to be recognized. This, however, produces acceptable recognition results only if the patterns to be recognized have a clear structure. This means that said known technique can be sensibly applied only for the recognition of characters from clear handwriting or typing. Another limitation is the variability of the number of features on which the recognition is based, i.e. the number of convex and concave structures in the pattern. This makes it difficult to apply deciders in the recognition, which work with a fixed number of features, such as, for example, those which make use of standard "feed-forward" neural networks.

U.S. Pat. No. 3,999,161 entitled "Method and Device for the Recognition of Characters Preferably of Figures," discloses another character recognition system of the above mentioned type. The recognition technique, on which this system is based, derives character features from a number of so-called views of an image, either the complete image or parts thereof, of a binary quantized pixel pattern of a character to be recognized. In this so-called views method, a number of different features of the pixel pattern is derived for each view, from above, from below and from the side, and for each image or part image. For these features, such as jumps, slopes, endpoints and islands, feature values are determined for specific patterns found in the views. During the check phase, the feature values found are weighted using adjustable weighting factors for each class of characters to be recognized. Said weighting factors have been obtained previously from a learning process on known characters. The weighted feature values are used to determine a score for each class. The character to be recognized is recognized as that character which belongs to the class in which the highest score has been determined.

This known technique, using the views method for deriving character features, has been developed in the first instance for recognizing digits. The character features which are derived in this process have been found to be too general for acceptable letter recognition. Moreover, because of the many different features for which a character to be recognized has to be checked, the method for deriving the features is rather complex. Because of the type of the features, which are in fact structural features, a recognition based on said features is furthermore sensitive to breaks in an image pattern of a character to be recognized, and this recognition method is therefore unsuitable for, for example, matrix writing, such as, in particular, letters printed by a matrix printer.

In digital picture processing, it is also known to make use of distance functions. Methods based thereon are sometimes denoted as "distance transform" or "distance mapping". A known "distance mapping" method of this type is, for example, disclosed by the paper entitled "Euclidean Distance Mapping" as published in Computer Graphics and Image Processing 14, pages 227–248 (1980) and authored by P.E. Danielsson. This involves assigning to each pixel, which may form part of a subset of pixels, in the object (or in the background) of the original binary image, the shortest distance to the nearest pixel in the background (or the object). Corresponding to each point there is thus a distance tag. Further processing is then carried out on the basis of this two-component description, in which processing, inter alia, skeleton structures of the character to be recognized being traced. A distance tag of this type is inadequate per se as a character feature for the purpose of, in particular, recognizing handwritten characters.

B. SUMMARY OF THE INVENTION

The aforementioned limitations as well as other shortcomings and deficiencies of the prior art are obviated, in accordance with the present invention, by a methodology and concomitant circuitry which utilize information about local views of a character description as determined relative to a set of reference points in the image plane.

Broadly, character features are derived for use in a character recognition system to recognize randomly occurring characters, such as letters and digits. Initially, a character description is generated from a recorded image pattern in an image plane wherein the image pattern is presumed to include a character pattern of a character to be recognized. The character description is expressed in terms of a set of boundary points, each boundary point being an image point which has different colors (e.g., black and white) of image points in its direct surroundings. A distance tag $D(R_i)$ is then assigned to each reference point $R_i$ in a set $R=\{R_i/i=1, 2, ---, N\}$ of a number N of preselected reference points in the image plane. The distance tag is obtained by performing a distance transform to determine the distance from each reference point $R_i$ to a nearest boundary point $P_i$ of the character description. This distance tag $D(R_i)$ is selected as one feature value for a character feature of the character pattern; there is one distance tag for each reference point. Another set of feature values is then determined to provide an additional character features which the character pattern possesses. Each feature value is determined with reference to the nearest boundary point $P_i$ corresponding to the reference point $R_i$ to which each distance tag $D(R_i)$ is assigned. For instance, one such additional feature relates to the position of the boundary point relative to the reference point.

C. BRIEF DESCRIPTION OF THE DRAWINGS

The invention will be explained in more detail by means of a description of an illustrative embodiment, with reference to a drawing in which.

D. DESCRIPTION OF AN ILLUSTRATIVE EMBODIMENT

Figure 1:
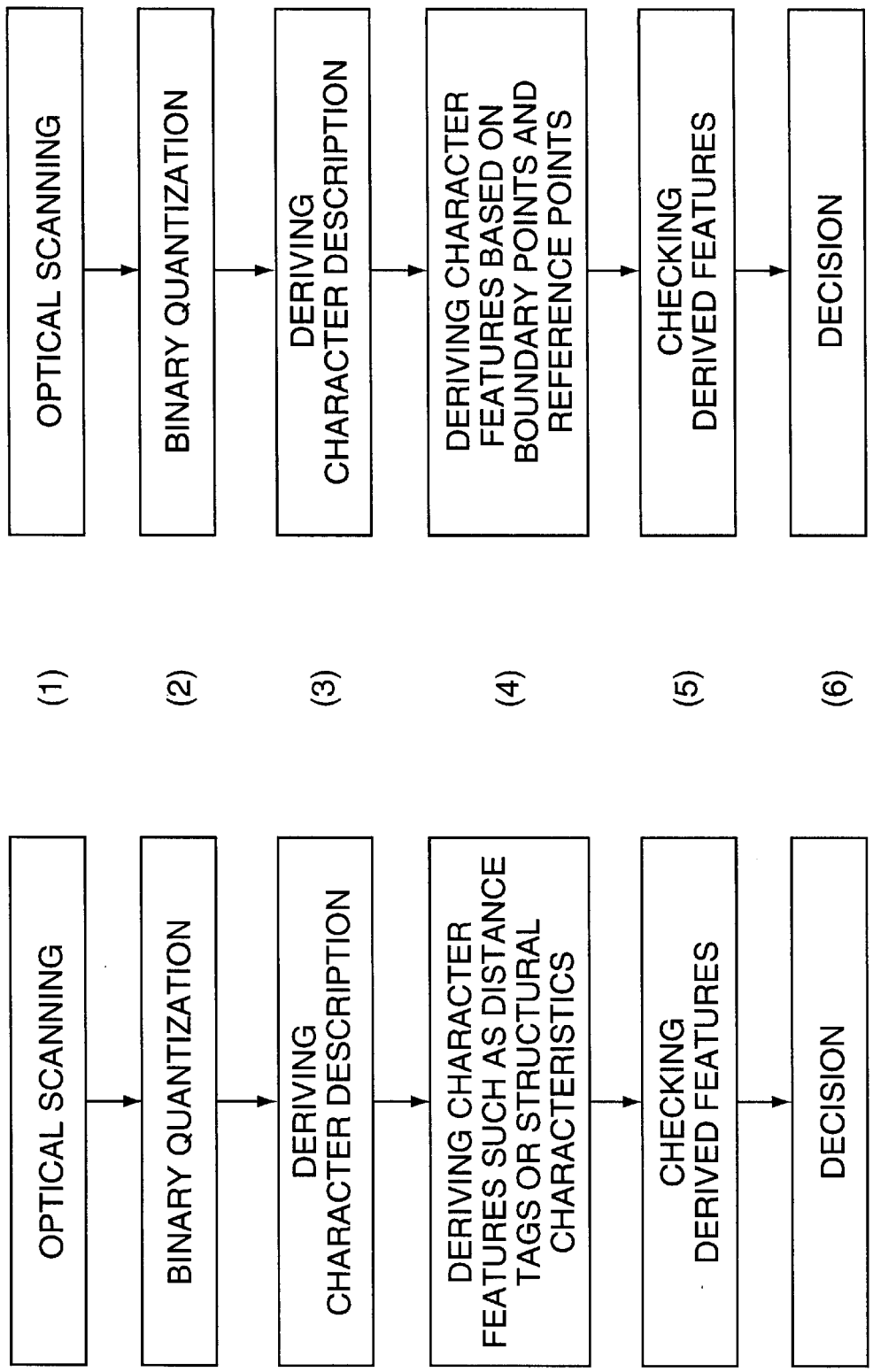
FIG. 1 shows a block diagram of process steps of a character recognition system, with FIG. 1a showing the prior art character recognition system, and FIG. 1b showing the character recognition system in accordance with the present invention.

The invention relates to a method for deriving character features for use in a recognition system for recognizing characters, such as, for example, printed or handwritten digits and letters. Starting from a description of a character to be recognized, the recognition proceeds on the basis of a number of features, derived from suitably determined boundary points, of the described character. The departure between the present invention and the prior art can be understood by comparing FIG. 1b to FIG. 1a. As evidenced by this comparison, the primary difference between the subject matter of the present invention and the prior art relates to process step (4), that is, the step wherein character features are derived. As already discussed in Section A.2. (Prior art), the character features conventionally derived merely included distance tags or structural characteristics, neither of which provided the resolution required for character recognition within acceptable limits. With respect to the present invention, the derived character features are based on reference points as well as the reference points in combination with boundary points (both of which will be described in detail shortly). The prior art is totally devoid of teachings or suggestions relating to the use of boundary points and reference points in a character recognition process.

The invention can be applied either to a pixel description or to a contour description of a character to be recognized. In either case, a requisite prior step must be effected before the processing of step (4) in FIG. 1a or FIG. 1b is invoked, namely, the pre-processing represented by process step (3) must occur. The processing effected by process step (3) is conventional, although the actual data stored as a result of the processing may be different for the present invention as compared to the prior art techniques. The inventive technique applied to a contour description will be described in detail hereinafter, whereas the inventive technique applied to a pixel description need be described only briefly because its description is commensurate with the discussion of the contour description. The process steps (1) and (2) are carried out according to known techniques by recording means which are known per se and are therefore not described in further detail here. In the further description of an illustrative embodiment it is assumed that these steps have taken place and that a black/white pixel pattern of a character to be recognized has been stored in a two-dimensional image memory and is accessible for further operations. Such a black/white pixel pattern in an image plane comprising LxM pixels has an elementary description, called the pixel description, by means of a function B(i,j), of pixel values for each pixel (i,j) in the image plane, where i=1, ---,L, and j=1, ---,M, which function is defined by B(i,j)=1 for each black pixel (i,j) and B(i,j)=0 for each white pixel (i,j) in the image plane.

It is further assumed that, if the character to be recognized is part of a row of simultaneously recorded characters, a segmentation operation has already been carried out on said row, according to techniques known per se, in order to separate the characters and make them suitable for separate treatment. The process steps (5) and (6) are also carried out by known techniques. Since, however, the checking and decision means required therefor must previously have been learnt, so that certain characters may be recognized on the basis of the character features derived according to the method according to the invention, such means will be briefly explained in more detail following a full description of the method.

In the field of image processing and pattern recognition, the so-called distance transform is known. This transform assigns a number D(P) to each image point P in an image plane of a black-and-white pattern of image points, in the following way:

- if the point P is situated in a white area of the image plane, then D(P) is equal to the distance to the nearest black image point; and
- if the point P is situated in a black area which, for example, represents a digit or a letter, then D(P) is equal to the distance to the nearest white image point, provided with a minus sign. The signed quantity D(P) is typically referred to as a "distance tag".

This distance transform is often used in so-called skeleton algorithms for tracing skeleton structures, the character recognition then being carried out on the basis of the skeleton structures found. An image signal thus transformed is also sometimes used directly for the purpose of the recognition process. A distance tag is then used as a character feature. If a limited number of image points is included in the process, for example to speed up the arithmetic operation, the distance tag is insufficient for describing a character to be recognized. To achieve an acceptable recognition probability, very large numbers, if not all, of the image points are therefore included in the transform. Nevertheless, the recognition of, in particular, handwriting is insufficient. The object of the invention, however, is to achieve a considerably higher recognition probability by adding one or more additional character features to each distance tag of a set of distance tags. This set of distance tags is obtained by carrying out a distance transform on a limited number N of reference points $R_i$, i=1,2, - - - ,N. The reference points have been preselected in a suitable way on the image plane. From geometrical considerations, it is apparent that if each reference point $R_i$ has a distance tag $D(R_i)$ assigned to it, generally there will be a corresponding unique boundary point $P_i$ for the given character to be recognized. A boundary point is to be understood as that image point which has both white and black image points in its direct surroundings. In the case of a contour description, a boundary point is a point on the contour, a contour point. Unless stated otherwise, from now on, a contour description and contour points will be assumed. By then considering the surroundings of a unique contour point $P_i$ and corresponding to a reference point $R_i$ (the manner of selecting each $P_i$ will be discussed shortly), it is possible to add, to the distance tag $D(R_i)$, one or more additional features, which, seen from such a reference point $R_i$, describe the course of a piece of the contour, which is nearest to the reference point $P_i$. This nearest piece of the contour part is called the contour piece and is indicated by $C(R_i)$. It was found that a very strong feature therefor is the feature which provides an estimate of the direction $H(R_i)$ of the contour at the contour point $P_i$. Other supplementary features to be named are those which provide an estimate of the second and third derivative of the contour in the contour point $P_i$. Said supplementary features, however, do not provide much of an additional contribution to increasing the recognition probability of a character. All these descriptions, on the basis of said additional features, of the said nearest contour pieces $C(R_i)$ for all the N reference points $R_i$ together are found to enable very effective recognition if N is sufficiently large. From 70 to 120 reference points are preferably used for each character, which points may be distributed regularly or randomly over the image plane. In an example given below, the method for determining the features $D(R_i)$ and $H(R_i)$ for a reference point $R_i$ in the image plane of a pattern to be recognized will be explained in more detail.

Figure 2:
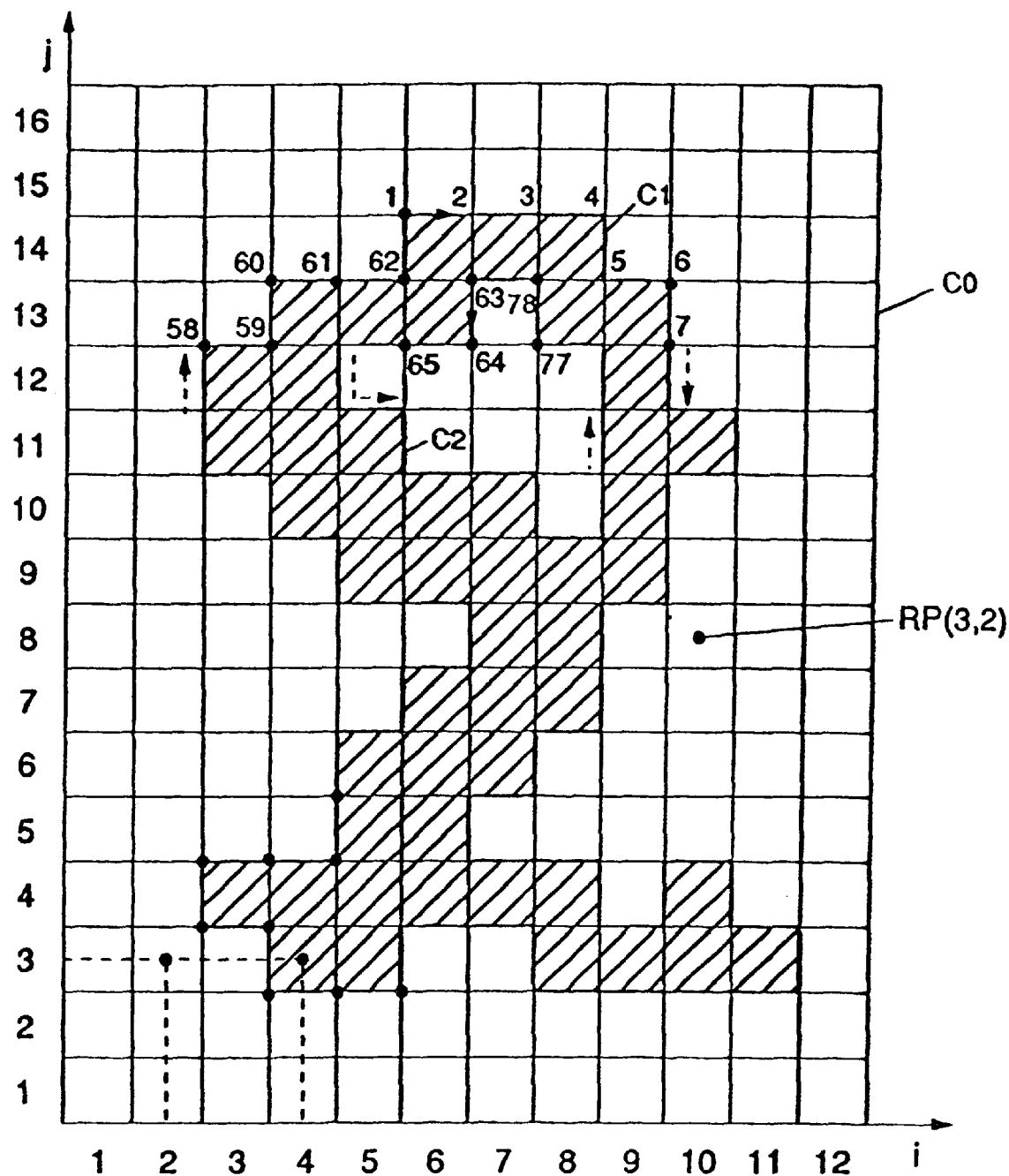
FIG. 2 represents a black/white pixel image of a character to be recognized having an inner and an outer contour.
Figure 3A:
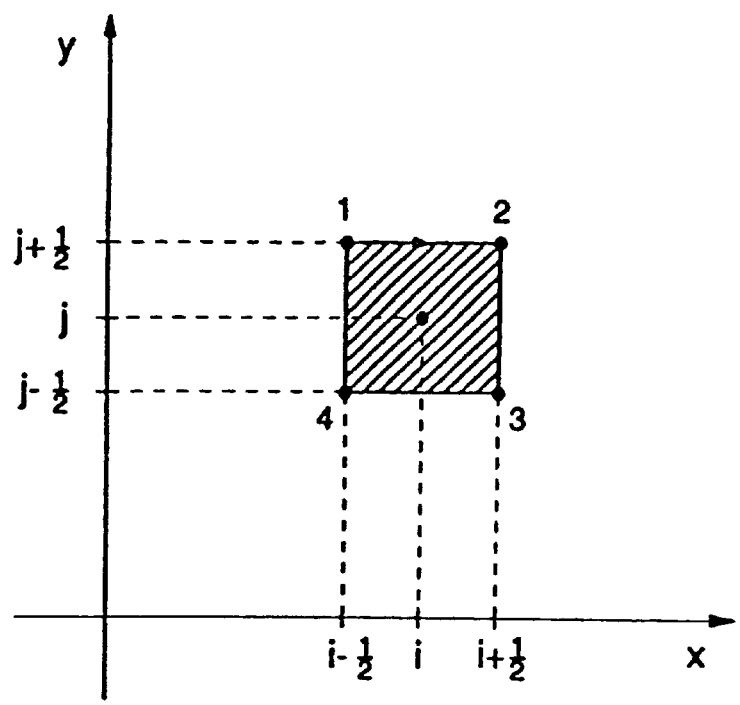
FIG. 3 illustrates a process of tracing a contour, with FIG. 3a showing the situation for a single black pixel, and FIG. 3b showing the situation after a kth contour point has been found.

For this purpose, FIG. 2 shows a black-and-white pattern of a separate character in a rectangle of 12 fields by 16, each field corresponding to a pixel. For the sake of clarity, the number of pixels in this example has been kept small. Each field is uniquely identifiable by means of its center coordinates (i,j), where i=1, - - - ,12 and j=1, - - - ,16. The black fields are hatched. Each field is black or white. Thus field (2,3) is white and field (4,3) is black. If a field (i,j) is black, then it has a pixel value B(i,j)=1; and, if it is white, then it has the pixel value B(i,j)=0. Where a black field adjoins a white field, the boundary lines are drawn as bold lines. Said two-dimensional description is then converted, by means of a process which is called contour tracer, into a one-dimensional contour description of the pattern of the character to be recognized. Said contour tracer successively runs through all the 12×16 fields of the pixel image while looking for contour points. Each time a starting point is found, a contour is generated. In this process, the contours are given a number, and their relative position is established by remembering whether a starting point found is situated within a previously determined contour. The process of tracing a contour is now explained in more detail with reference to FIG. 3 with sections 3a and 3b. In this process, each pixel is regarded as a black or white small square of finite dimensions. The corners of such a square are called grid points. In FIG. 3a, a single black pixel having centre coordinates (i,j) is shown as a hatched small square, with numbered grid points 1 to 4 inclusive. A separate black pixel by itself already has a well-defined contour, which is formed by the boldly drawn periphery segments from 1 to 2, from 2 to 3, etc., which encloses the black area in a clockwise direction (according to the direction of the arrow). The x,y coordinates of said four contour grid points 1 to 4 inclusive are chosen as:

$$(x(1), y(1)) = (i - 0.5, j + 0.5)$$
$$(x(2), y(2)) = (i + 0.5, j + 0.5)$$
$$(x(3), y(3)) = (i + 0.5, j - 0.5)$$
$$(x(4), y(4)) = (i - 0.5, j - 0.5)$$

Figure 3B:
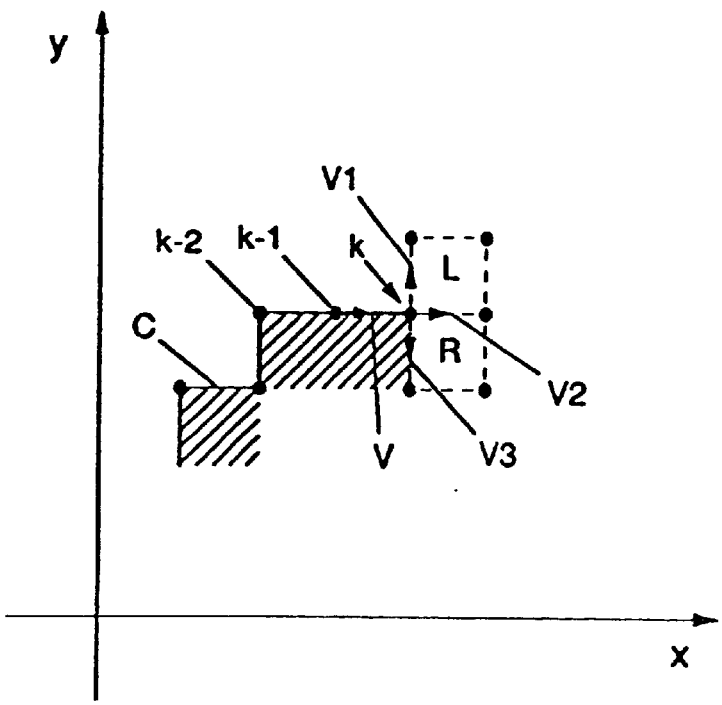

In FIG. 3b the situation is shown where, when tracing a contour C after the (k−2)th and the (k−1)th contour grid point, when coming from an arrival direction v, a grid point (x(k),y(k)) has been found as the kth contour point. The arrival direction v=(vx,vy) has four possible values, which can be expressed as follows: (1,0), (−1,0), (0,1) and (0,−3). In the example drawn it is (1,0). To the left and to the right of the continuation of the arrival direction v, past the kth contour point, two pixels L and R are shown as broken lines. Three directions are possible, in which the following (k+1)th contour point may be found, shown in the figure as $v_1$, $v_2$ v and $V_3$. The direction in which the following contour point is found depends on the pixel value B of each of the pixels L and R. The center coordinates of the pixels L and R, given the arrival direction (vx, vy) and the coordinates of the kth contour grid points, are:

iL=x(k)+(vx−vy)/2 and jL=y(k)+(vx+vy)/2
iR=x(k)+vx+vy/2 and jR=y(k)+(vx−vy)/2

The (k+1)th contour grid point and associated arrival direction are determined by means of a contour tracing algorithm, which may have the following appearance:

if B(iL,jL)=1 then begin vx :=−vy; vy :=vx end else
if B(iR,jR)=0 then begin vx:=vy; vy :=−vx end;
x(k+1) :=x(k)+vx; y(k+1) :=y(k)+vy; k :=k+1;
continue to next point;

To find the contours of a pixel image such as that shown in FIG. 2, the image plane is scanned from left to right and from top to bottom. A first starting point for a contour is found if, during this scan, the first black pixel, in the example pixel (6,14), is found. The first two contour points selected in this case are those corresponding to contour grid points 1 and 2 in FIG. 3a, with v=(1,0) as arrival direction in the second contour grid point. The contour tracing algorithm is then started until a return is made to the first contour grid point. For each new start of the contour tracing algorithm, a contour number CN is increased by one. During each execution of the contour tracing algorithm, the pixels which belong to the same contour are marked with the same contour number CN. This marking is remembered in a separate, second image memory. Prior to the commencement of scanning of the image plane, all the pixels in the second image memory have the same initial mark, for example zero. After completion of a contour, the pixel image is scanned further in the search for a starting point for a next contour. The next starting point is found if, during further scanning, a black pixel is found which has not yet been marked, or if an unmarked white pixel is found within a previously found contour. In such a case the tracing algorithm is again run through. During the run-through, all the contour grid points found are recorded, in the order found, in a contour table, including an associated contour account. Said account comprises, for each contour, the number CN of the contour, pointers nrept and nrlpt to the first and last contour grid point of the contour in question, respectively, and a code cdoc which indicates the number of the immediately surrounding contour. The periphery of the whole pixel image is considered, in this context, as a virtual contour having the number 0. The pixel image of FIG. 2 has a first contour C1, whose contour grid points are successively numbered 1, 2, 3,---, 61 and 62. It has a second contour C2, whose contour grid points are numbered 63, 64,---, 77 and 78, and which is entirely situated within the first contour C1. The associated contour table is shown in Table 1 with subsections 1a and 1b, the contour account being incorporated in subsection 1a, and Table 1b forming the list of contour grid points.

By way of example, assume a set RP of reference points RP(m,n), comprising a number of pixel center:

RP={RP(m,n)=(4m−2,5n−2)|m,n=1,2,3}

One of said reference points, RP(3,2), has been drawn in FIG. 2. If, from such a point, the local shape of the nearest contour piece, in this case of contour C1, is investigated, features are obtained of a rather angular and busy pattern. Therefore, prior to commencing the feature derivation proper, the contour description obtained by the above contour tracing algorithm is first supplied to what can be called a contour filtering process, which produces a contour with a quieter outline. This is carried out, again by way of example, with a simple linear filter which, running along the contour, always determines a weighted mean of the corresponding contour grid points. In this process, the filtering step is always carried out with an offset of one grid spacing. The result of this filtering is a new, equally long list of contour points, which are usually no longer grid points, and which form the corners of a polygon with a quiet outline. If the length of such a linear filter is chosen to be four grid units, each filtering step always involves five successive contour grid points from the contour table. A new contour table is compiled by assigning new coordinates to the coordinates of each kth contour grid point in the now old contour table by:

X(k)=x(k−2)/8+x(k−1)/4+x(k)/4+x(k+1)/4+x(k+2)/8
Y(k)=y(k−2)/8+y(k−1)/4+y(k)/4+y(k+1)/4+y(k+2)/8

Figure 4:
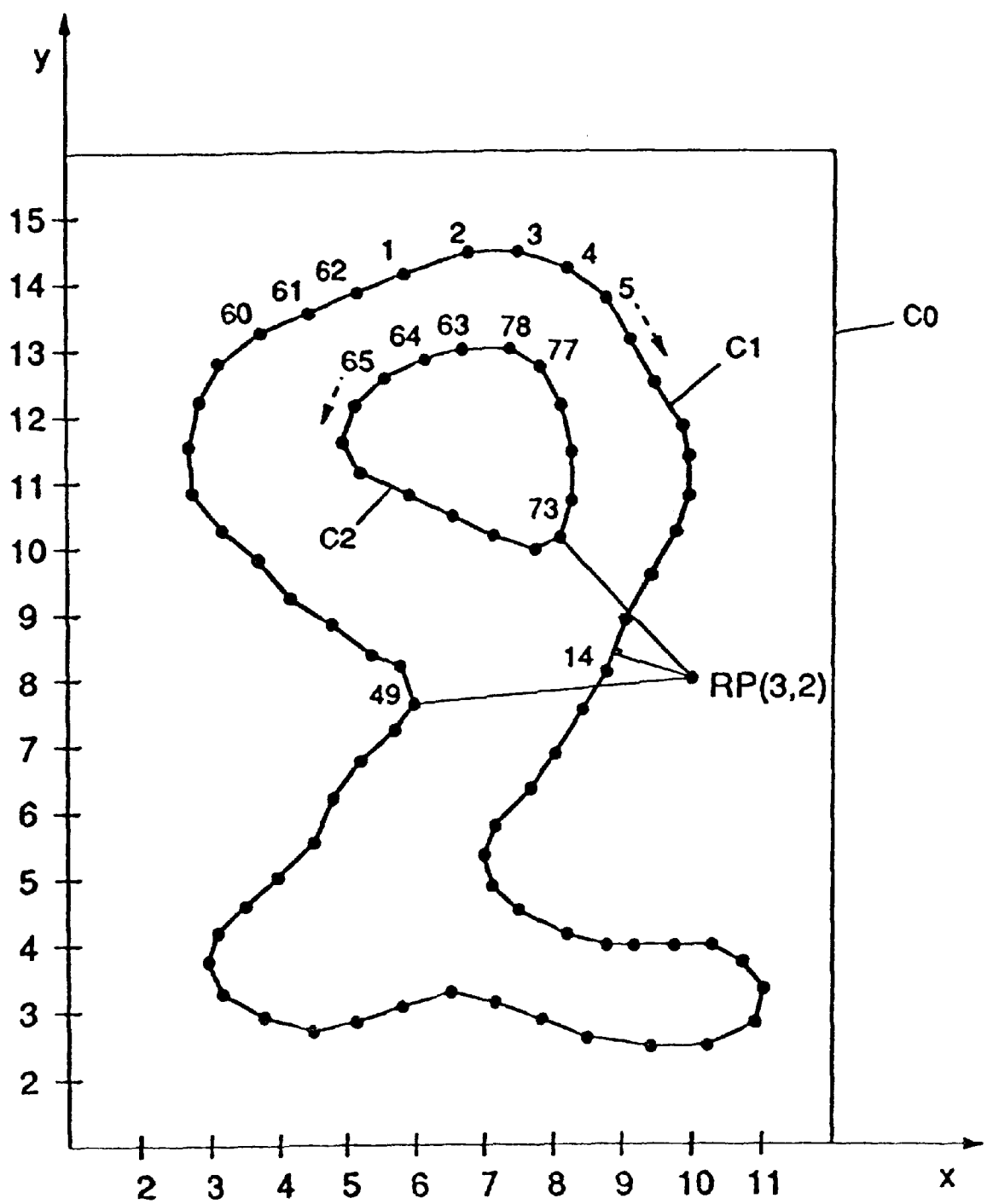
FIG. 4 represents the contour outline after filtering of the contours of the pixel image according to FIG. 2.

When applied to the image pattern shown in FIG. 2 with the contour table according to Table 1b, this produces a new contour outline which is depicted in FIG. 4, and whose associated contour table is shown in Table 2 with the list of new coordinates of the contour points. The contour account in this case has remained unchanged.

Figure 5A:
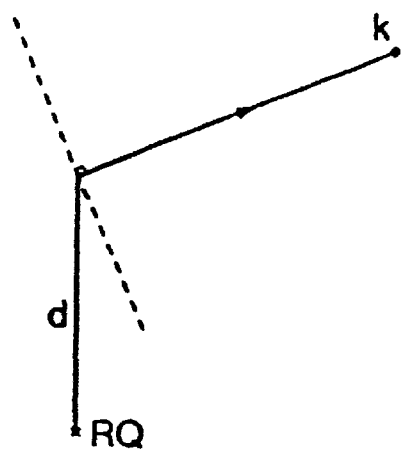
FIG. 5 shows, in the subsections FIGS. 5a, 5b and 5c, three different situations of the position of a reference point with regard to a contour chord.
Figure 5B:
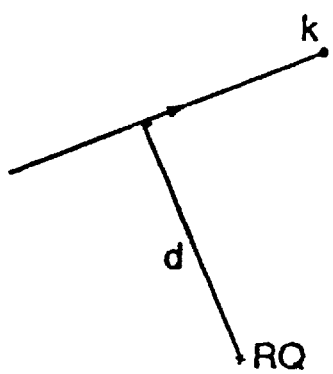
Figure 5C:
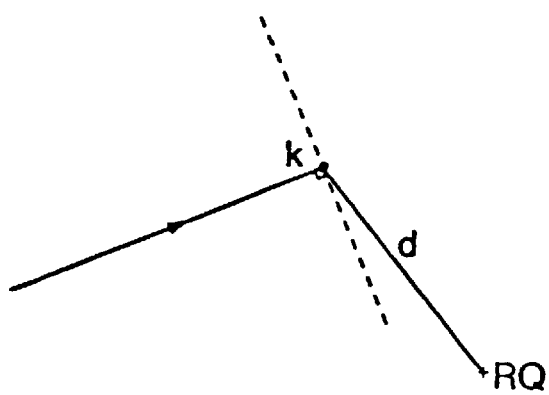

It is the case that the contour description is more suitable for the derivation proper of local contour features D and H for each of the reference points of the set RP. In this process, each contour is regarded as being composed of chords. A chord, with the number k, is the straight connection line segment between two successive numbered contour points k−1 and k, including the contour point k as the end point, and excluding the contour point k−1 as the starting point. The list of contour points in the contour table thus becomes a list of end points of successive chords which constitute the contours specified in the contour account. It is then determined, for each reference point from the set RP, which of the chords of all the contours in the contour table the reference point Dmin(RQ) is at the shortest distance from as well as said shortest distance itself. This is achieved by running successively through the list of end points of the chords. Depending on the position of a reference point RQ with regard to a chord k, three different situations may arise. These are shown diagrammatically in FIG. 5 with subsections 5a, 5b and 5c. In the situation according to FIG. 5a, the most closely situated point is in fact the starting point of the chord k. The minimum distance Dmin(RQ) found so far has therefore already been determined in the case of a preceding chord. In the situations according to Figs 5b and 5c, respectively, a point P of the chord k and the end point of the chord k are the nearest points which are at a distance d from the reference point RQ. In both cases a test is then carried out to discover whether this distance d found is shorter than the minimum distance Dmin(RQ) previously recorded so far. If so, the distance d found is recorded as the new value for Dmin(RQ), together with the associated chord number. The following formulae are used for calculating the distance: in the situation according to FIG. 5b:

$d^2=(ax^*cy-ay^*cx)^2/(cx^2+cy^2)$ and in the situation according to FIG. 5c:

$d^2=ax^2+ay^2$ in which $ax = x(RQ) - X(k)$    and    $ay = y(RQ) - Y(k)$ $cx = X(k) - X(k-1)$    and    $cy = Y(k) - Y(k-1)$ In fact, the minimum d2 is first determined, and only if this has been found is its root calculated. At the same time, the process checks whether the reference point RQ in question is located to the left or the right of the contour of which the chord with with minimum distance Dmin(RQ) forms part. This is done by determining the inner product (ax*cy−ay*cx) of the vector (cy,cx) perpendicular to the chord, which is now interpreted as a vector (cx,cy), with the vector (ax,ay) defined by the end point of the chord and the reference point RQ. If the value of the inner product is positive, the reference point RQ is located to the right and, if negative, to the left of the contour. Since a contour is always chosen clockwise around black, it is then known whether the reference point RQ in question is situated in a "black" or in a "white" area of the filtered image pattern.

The desired features at the reference point RQ are now determined as follows:

(i) $D(RQ) = Dmin(RQ)$ if $RQ$ is in a "white" area;

$D(RQ) = -Dmin(RQ)$ if $RQ$ is in a "black" area;

(ii) $H(RQ) =$ direction of the nearest chord found which is calculated as the direction of the vector $[X(k) - X(k-1), Y(k) - Y(k-1)]$ in the situation according to FIG. 5b;

$H(RQ) =$ direction of the vector perpendicular to the connecting line between the end point of the nearest chord and the reference point $RQ$, which is calculated as the direction of the vector $\pm [Y(k) - Y(RQ), -X(k) + X(RQ)]$ in the situation according to FIG. 5c, the plus/minus sign applying according to whether the reference point $RQ$ is situated in "black" or "white", respectively.

The direction feature is preferably expressed as an angle, and it can be calculated, for example, by means of a $\cos^{-1}$, a $\sin^{-1}$, or a $\tan^{-1}$ function. When applied to the filtered contour description as shown in FIG. 4, it is found for a reference point RP(3,2) that the chord having number 14 is at the shortest distance. Since the reference point is located in "white" the minimum distance is to be regarded as positive, and the direction feature H(RP(3,2))=direction of the vector [X(14)-X(13), Y(14)-Y(13)].

As already mentioned previously, the method according to the invention can be carried out not only with a contour description of an image pattern. A description on a pixel basis, the pixel description B(i,j), is similarly directly suitable for determining the features D(RQ) and H(RQ). In the case of this description, it is, moreover, possible to make use of one of the many known algorithms for determining the distance transform. If pixel center are again chosen as reference points, a simple algorithm can proceed as follows:

if a reference point RQ is located in "white", the pixel surroundings round the reference point RQ are scanned in steadily increasing "circles" until the nearest "black" pixel Z has been found. Then the features are chosen as follows:

$D(RQ) = \{(i(Z)-i(RQ))^2 + (j(Z)-j(RQ))^2\}^{1/2}$ and

H(RQ)=direction of the vector $[-j(Z)+j(RQ), i(Z)-i(RQ)]$

If RQ is situated in a "black" area, the nearest "white" pixel W is, of course, searched for, and the analogous expressions then apply for the features. The above mentioned selection for the directional feature H(RQ) is very simple, but rather coarse. Refinements can be obtained by including surrounding points of Z or W, whose pixel value correlates with Z or W.

The features obtained according to the manner described above, on the basis of either a pixel description or a contour description of a character to be recognized, form the elements of a vector, the feature vector $V=\{v_n\}$ with $n=1, ---, 2N$, the row of vector coefficients being chosen as $\{v_n\}=\{D(R_1), H(R_1), D(R_2), H(R_2), ---, D(R_N), H(R_N)\}$.

Figure 6:
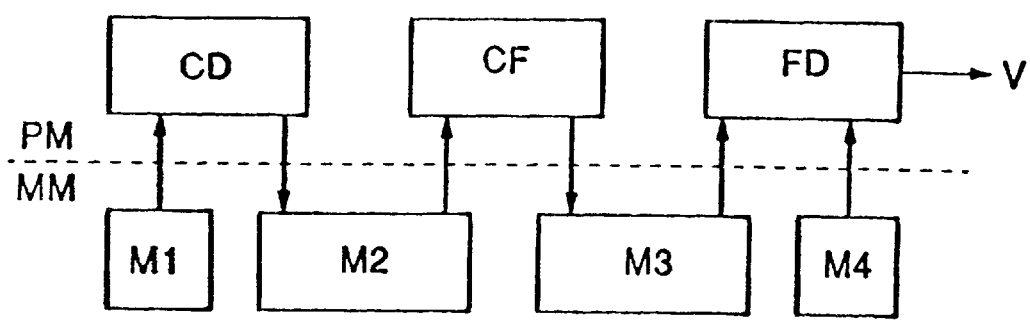
FIG. 6 shows an overview as a block diagram of processor and memory means for the specific purpose of carrying out the process steps (3) and (4) from FIG. 1 according to the invention.

FIG. 6 shows, as a block diagram, an overview of processor means PM and of memory means MM, which are specific for carrying out the process steps (3) and (4) from FIG. 1 according to the method described above for deriving character features. Below a broken dashed line, the memory means are shown, indicated by M1, M2, M3 and M4, and above said dashed line are shown the processor means PM for carrying out three processes indicated by CD, CF and FD. The relationship is as follows. The process CD describes the contour of a character. It carries out the contour tracing algorithm on the image pattern of the character which, after process steps (1) and (2) from FIG. 1 have been carried out, is available in a first memory M1, the image memory; and it puts the contour description obtained into a second memory M2. Then the process CF carries out the contour filtering process on the contour description put into the second memory M2, and puts the filtered contour description thus obtained into a third memory M3. Stored in a fourth memory M4 is a list with coordinate data of the reference points $R_i$ of the set RP. The process FD carries out the feature derivation for all the reference points from the list in the fourth memory M4 on the filtered contour description present in the third memory, and outputs the feature vector V thus found.

Figure 7:
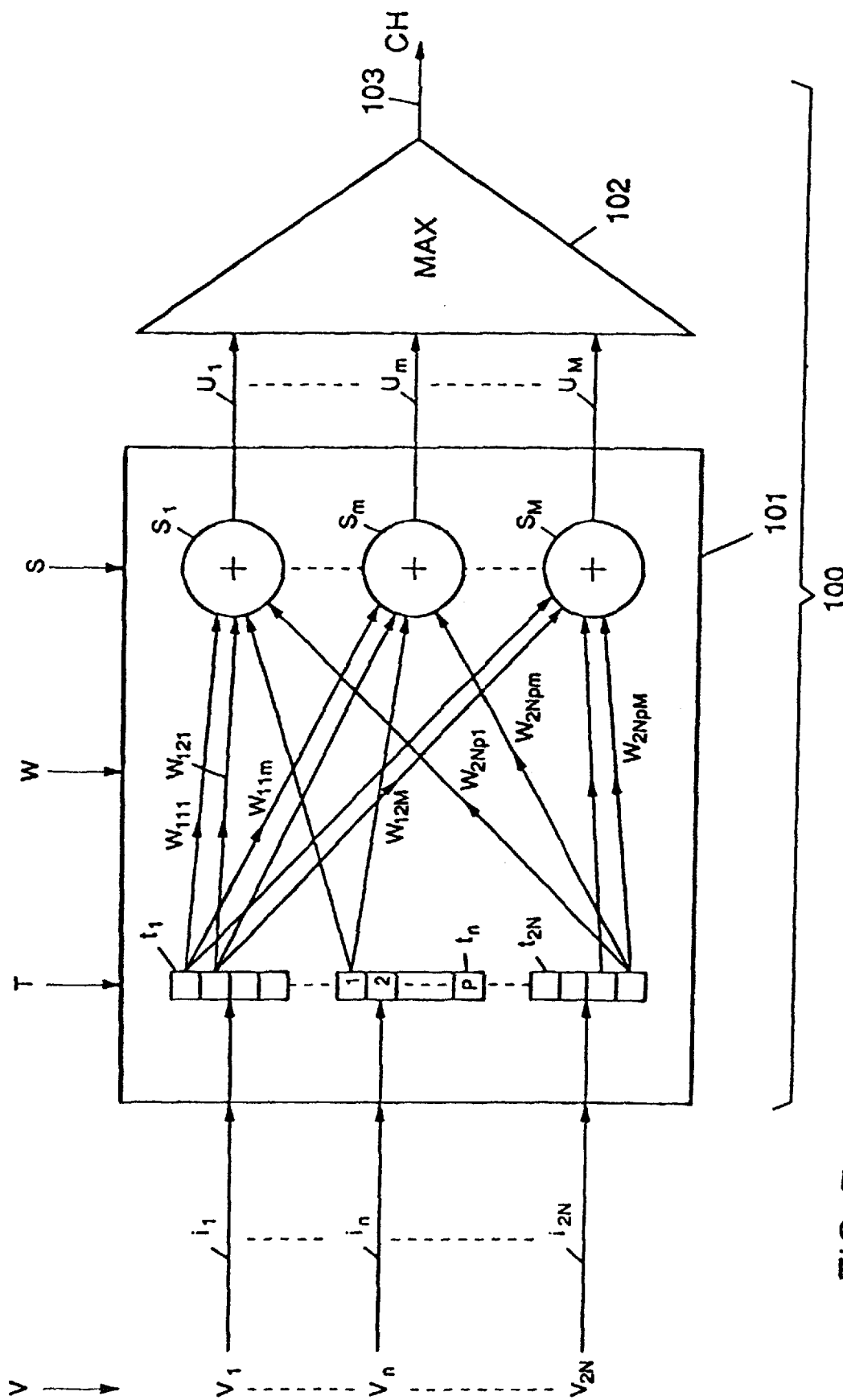
FIG. 7 shows a diagram of a decider for carrying out the process steps (5) and (6) according to FIG. 1, as applied in combination with the method according to the invention.

The feature vector V is subsequently presented to combined checking and decision means, designated decider 100, of which a diagram is shown in FIG. 7, for carrying out the process steps (5) and (6) of FIG. 1. The decider 100 comprises a feature checker 101 and a maximum selector 102. The feature checker has as many inputs $I_n$ as the feature vector V has coefficients, in the present example, therefore, 2N, for receiving all the coefficients $v_n$, the derived feature values; and as many outputs $u_m$ as the total number M of characters to be recognized. Said number M is, for example, 34, if the set of characters to be recognized is formed by the digits 0, 1, ---, 9 and the capital letters A, B, ---, Z. For each feature vector V presented at the input of the feature checker 101, the latter determines a score vector $S=\{s_m|m=1, ---, M\}$, each coefficient $s_m$ of which expresses the measure, according to which the presented feature vector V fits the mth character from the set of characters to be recognized. The coefficients of the score vector S are presented, via the outputs $u_m$, to the maximum selector 102. Said maximum selector 102 determines the largest of the coefficients $s_m$ and outputs a signal CH at its output 103, according to the character from the character set to be recognized, which corresponds to the determined largest coefficient. The feature checker is preferably a multi-layer neural network, e.g. composed of three layers of perceptrons, as disclosed, for example, by reference [4]. In FIG. 7, however, the feature checker 101 has been shown simply only as a single-layer neural network having a number M of perceptrons. Three steps are to be distinguished in the feature checker 101, viz.:

a distribution step, denoted by the letter T;

a weighting step, denoted by the letter W; and a summation step, denoted by the letter $\Sigma$.

The feature values presented with the feature vector V to the feature checker 101 are, as derived, continuous values. In the distribution step T each presented value $v_n$ is, as it were, distributed by distribution units $t_n(n=1, ---, 2N)$ by presenting the same value in a multiple way, viz. in M directions, i.e. as many as there are perceptrons. During the weighting step W each feature value $v_n$ in each direction m is weighted by means of a weighting factor $W_{nm}$ from a set of weighting factors $\{W_{nm}\}$. This set of weighting factors in fact forms a dimensional array, the weighting factor matrix, where $n=1, ---, 2N$ is the number of a presented feature value $v_n$, and $m=1, ---, M$ is the number of a character to be recognized in the set of characters to be recognized. With the aid of the weighting factors, a score is then determined in the summation step Σ by each one of a number M of summators $\sigma_m$, which score forms the previously mentioned coefficient $s_m$ of the score vector S. For each summator $\sigma_m$ this score is:

$s_m = f(\Sigma w_{nm} * v_n)$ in which the summation is carried out over all n=1, - - - ,2N and f represents a non-linear function such as a sigmoid. This is indicated in FIG. 7 by arrows from each distribution unit tn to each of the summators $\sigma_m$. The arrows here are provided with their associated weighting factor from the weighting factor matrix.

The coefficients $s_m$ of the score vector S are presented to the maximum selector 102. The weighting factor matrix $\{w_{nm}\}$ is located in a memory accessible to the decider. The coefficients of this matrix have been predetermined according to a training algorithm which is known as the "back propagation containing algorithm" (see, for example, the reference entitled "An introduction to computing with neural nets," IEEE ASSP Magazine, April, 1987, pages 4–22, particularly Box 6.). In that case, character features were presented to the decider of known characters from a training set of known characters, which had been derived with the aid of the new method described above.

When applied to a large test set of practice material (approximately 200,000) of readily separable which worked with the new method for deriving the character features "distance" and "direction", was found to satisfactorily recognize 99.3% of the characters presented. If only the character feature "distance" was used, the maximum yield was found to be 98.6%.

TABLE 1a

| CN | nrept | nrlpt | cdoc |
|----|-------|-------|------|
| 1  | 1     | 62    | 0    |
| 2  | 63    | 78    | 1    |

TABLE 1b

| k  | x   | y    |
|----|-----|------|
| 1  | 5.5 | 14.5 |
| 2  | 6.5 | 14.5 |
| 3  | 7.5 | 14.5 |
| 4  | 8.5 | 14.5 |
| 5  | 8.5 | 13.5 |
| 6  | 9.5 | 13.5 |
| 7  | 9.5 | 12.5 |
| .  | .   | .    |
| .  | .   | .    |
| .  | .   | .    |
| 60 | 3.5 | 13.5 |
| 61 | 4.5 | 13.5 |
| 62 | 5.5 | 13.5 |
| 63 | 6.5 | 13.5 |
| 64 | 6.5 | 12.5 |
| 65 | 5.5 | 12.5 |
| .  | .   | .    |
| .  | .   | .    |
| .  | .   | .    |
| 76 | 8.5 | 12.5 |
| 77 | 7.5 | 12.5 |
| 78 | 7.5 | 13.5 |

TABLE 2

| k  | X     | Y      |
|----|-------|--------|
| 1  | 5.875 | 14.125 |
| 2  | 6.625 | 14.375 |
| 3  | 7.375 | 14.375 |
| 4  | 8.125 | 14.125 |
| 5  | 8.750 | 13.75  |
| 6  | 9.125 | 13.125 |
| 7  | 9.5   | 12.5   |
| .  | .     | .      |
| .  | .     | .      |
| .  | .     | .      |
| 60 | 3.875 | 13.125 |
| 61 | 4.5   | 13.5   |
| 62 | 5.125 | 13.875 |
| 63 | 6.75  | 13.0   |
| 64 | 6.125 | 12.875 |
| 65 | 5.5   | 12.5   |
| .  | .     | .      |
| .  | .     | .      |
| .  | .     | .      |
| 76 | 8.125 | 12.125 |
| 77 | 7.75  | 12.75  |
| 78 | 7.25  | 13.0   |

What is claimed is:

1. A method for character recognition comprising the steps of:
   (a) deriving character features from a character to be recognized, wherein an image plane of image points includes a pattern of the character, comprising the sub-steps of:
      (a1) deriving, for each one of a set of reference points in the image plane, distance data indicative of a distance to a nearest one of the image points on a boundary contour associated with the pattern of the character to be recognized, the set of reference points having been pre-selected independent of the character to be recognized and the nearest one image point defining a corresponding nearest boundary point;
      (a2) deriving, for said each one of the reference points, boundary direction data indicative of a tangential direction of the boundary at the corresponding nearest boundary point; and
      (a3) determining a feature vector for the character to be recognized containing, as vector coefficients, the distance data and the boundary direction data; and
   (b) deciding, in response to the feature vector and also derived distance data and boundary direction data previously obtained for a set of known characters, which one of the known characters is depicted by the pattern.

2. The method as recited in claim 1 wherein the set of reference points includes points randomly distributed in the image plane.

3. The method as recited in claim 1 wherein the set of reference points includes points regularly distributed in the image plane.

4. The method as recited in claim 1 wherein a total number of reference points in the image plane exceeds 70 but is less than 120.

5. The method as recited in claim 4 wherein the set of reference points includes points randomly distributed in the image plane.

6. The method as recited in claim 4 wherein the set of reference points includes points regularly distributed in the image plane.

7. The method as recited in claim 4, wherein the boundary points are contour points on a filtered contour, further comprising the step of contour tracing and filtering the contour prior to deriving the distance and boundary direction data for said each one of the reference points.

8. The method as recited in claim 1, wherein the boundary points are contour points on a filtered contour, further comprising the step of contour tracing and filtering the contour prior to deriving the distance and boundary direction data for said each one of the reference points.

9. The method as recited in claim 1 wherein the boundary direction data deriving step comprises the step of deriving, for said each one of the reference points, boundary direction data indicative of a second derivative of the boundary contour at the corresponding nearest boundary point.

* * * * *